United States Patent
Cha et al.

(10) Patent No.: US 8,957,911 B2
(45) Date of Patent: Feb. 17, 2015

(54) METHOD AND APPARATUS FOR EDITING TOUCH DISPLAY

(75) Inventors: Sang-ok Cha, Daegu (KR); Sang-jun Han, Seoul (KR); Jung-hyun Shim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 122 days.

(21) Appl. No.: 13/325,814

(22) Filed: Dec. 14, 2011

(65) Prior Publication Data

US 2012/0176403 A1  Jul. 12, 2012

(30) Foreign Application Priority Data

Jan. 10, 2011 (KR) .................. 10-2011-0002402

(51) Int. Cl.
| | |
|---|---|
| G09G 5/00 | (2006.01) |
| G06F 3/041 | (2006.01) |
| G06F 3/033 | (2013.01) |
| G06F 1/16 | (2006.01) |
| G06F 3/01 | (2006.01) |
| G06F 3/0486 | (2013.01) |
| G06F 3/0488 | (2013.01) |

(52) U.S. Cl.
CPC .............. *G06F 1/1694* (2013.01); *G06F 3/017* (2013.01); *G06F 3/0486* (2013.01); *G06F 3/04883* (2013.01); *G06F 2200/1637* (2013.01)
USPC .............................. 345/619; 345/173; 345/157

(58) Field of Classification Search
CPC .............. G06F 2200/1637; G06T 2207/10016
USPC .................................. 345/619, 173; 455/566
See application file for complete search history.

(56) References Cited

U.S. PATENT DOCUMENTS

| | | | |
|---|---|---|---|
| 2009/0197635 A1 | 8/2009 | Kim et al. | |
| 2009/0303199 A1 | 12/2009 | Cho et al. | |
| 2009/0315848 A1 | 12/2009 | Ku et al. | |
| 2010/0001980 A1 | 1/2010 | Kim et al. | |
| 2010/0007613 A1* | 1/2010 | Costa | 345/173 |
| 2010/0085318 A1* | 4/2010 | Lee et al. | 345/173 |
| 2010/0099462 A1* | 4/2010 | Baek et al. | 455/566 |
| 2010/0182265 A1* | 7/2010 | Kim et al. | 345/173 |
| 2011/0122077 A1* | 5/2011 | Choi | 345/173 |

FOREIGN PATENT DOCUMENTS

| | | |
|---|---|---|
| EP | 2 128 823 | 12/2009 |
| EP | 2 138 929 | 12/2009 |

(Continued)

OTHER PUBLICATIONS

Australian Examination Report dated Oct. 1, 2014 issued in a counterpart application No. 2011354808.

*Primary Examiner* — Kee M Tung
*Assistant Examiner* — Nicole Gillespie
(74) *Attorney, Agent, or Firm* — The Farrell Law Firm, P.C.

(57) ABSTRACT

A method and an apparatus are provided for editing a display of a touch display apparatus. A first screen including at least one object is displayed. An object on the first screen is designated. The touch display apparatus is converted to an edit mode for editing the display, when the object is designated. When a movement of the touch display apparatus is detected, the first screen is converted into a second screen according to at least one of a degree and a direction of the movement. The designated object is displayed on the second screen.

26 Claims, 13 Drawing Sheets

(56) References Cited

FOREIGN PATENT DOCUMENTS

| | | |
|---|---|---|
| EP | 2 144 139 | 1/2010 |
| JP | 2004-038894 | 2/2004 |
| KR | 1020090122805 | 12/2009 |
| KR | 1020100001601 | 1/2010 |
| KR | 1020100005439 | 1/2010 |
| KR | 1020100019167 | 2/2010 |

* cited by examiner

Look over here !

A Brown stone
city is famous for its great mountains
many visitors have
visited this place

| REPLY | A Brown stone |

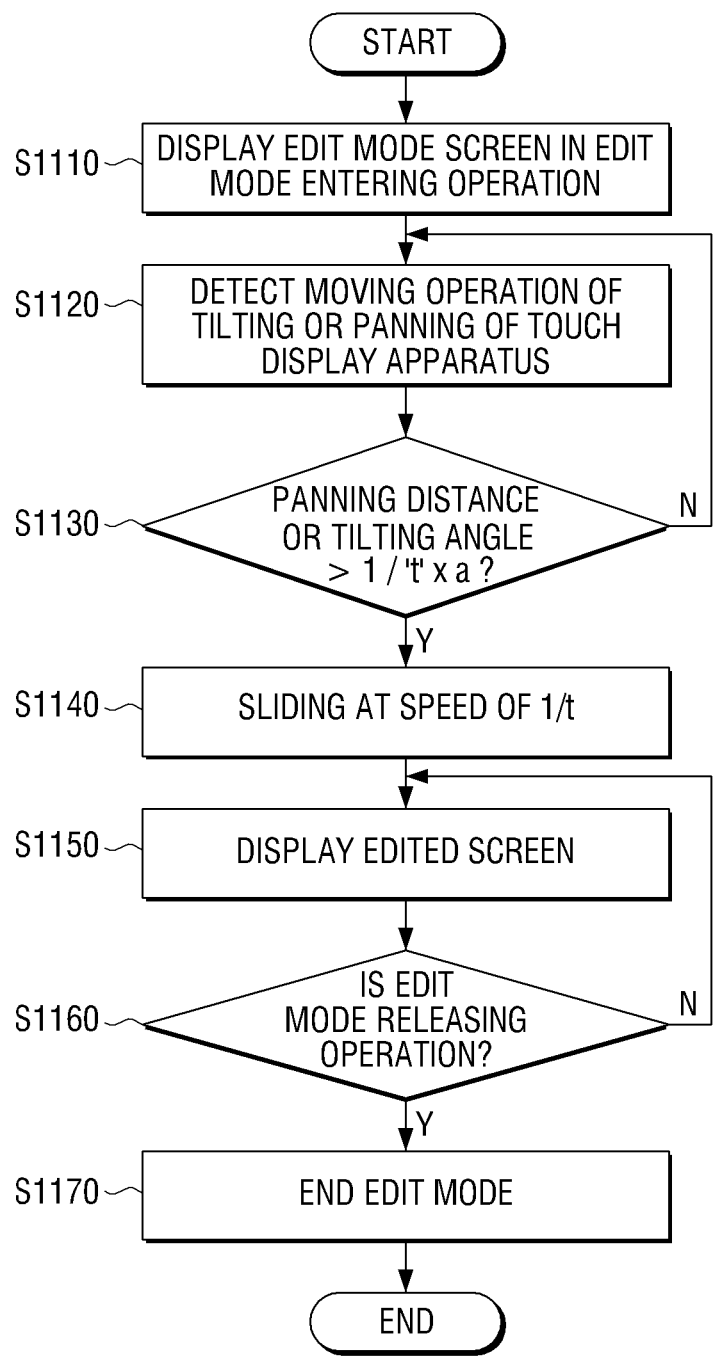

METHOD AND APPARATUS FOR EDITING TOUCH DISPLAY

PRIORITY

This application claims priority under 35 U.S.C. §119(a) to Korean Patent Application No. 10-2011-0002402, filed on Jan. 10, 2011, in the Korean Intellectual Property Office, the disclosure of which is incorporated herein by reference.

BACKGROUND OF THE INVENTION

1. Field of the Invention

The present invention relates generally to a Graphic User Interface (GUI), and more particularly, to a touch display apparatus and display method thereof.

2. Description of the Related Art

It is commonly known in the art to select icons, menus, or GUI items on a display, using a pointer. To input user commands in a GUI environment, the user moves the pointer to a desired item using an input device, such as a touch pad, and executes the function of the item on which the pointer is located by pushing a specific button provided on the input device.

A user can also select the desired GUI item by touching a screen of a touch display.

However, when a user edits a background screen of the GUI, the user may have difficulty moving one icon from an initial page of a background screen to another page of the background screen. Specifically, the user would have to move the icon to a screen terminal of a background page in an edit mode, and then place the icon on next background screen if the next page background screen is displayed after a predetermined time has elapsed.

The issue is especially magnified when the user moves a specific icon to a designated background screen that is a number of pages away from the initial background screen.

SUMMARY OF THE INVENTION

The present invention has been made to address at least the above problems and/or disadvantages and to provide at least the advantages described below. Accordingly, an aspect of the present invention provides a touch display apparatus with ease display edit and a display method thereof.

According to one aspect of the present invention, a method of editing a display of a touch display apparatus is provided. A first screen including at least one object is displayed. An object on the first screen is designated. The touch display apparatus is converted to an edit mode for editing the display, when the object is designated. When a movement of the touch display apparatus is detected, the first screen is converted into a second screen according to at least one of a degree and a direction of the movement. The designated object is displayed on the second screen.

According to another aspect of the present invention, a touch display apparatus is provided. The apparatus includes a user interface unit that displays a first screen including at least one object and receives a designation of an object on the first screen. The apparatus also includes a sensor unit that detects a movement of the touch display apparatus. The apparatus further includes a control unit that converts the touch display apparatus to an edit mode for editing the display when the designation of the object on the first screen is received, and when a movement of the touch display apparatus is detected, converts the first screen into a second screen according to at least one of a degree and a direction of the movement and controls the user interface unit to display the designated object on the second screen.

According to a further aspect of the present invention, an article of manufacture is provided for editing the display of a touch display apparatus. The article of manufacture includes a non-transitory machine readable medium containing one or more programs which when executed implement the steps of displaying a first screen including at least one object; designating an object on the first screen; changing the touch display apparatus to an edit mode for editing the display, when the object on the first screen is designated; when a movement of the touch display apparatus is detected, changing the first screen into a second screen according to at least one of a degree and direction of the movement; and displaying the designated object on the second screen.

BRIEF DESCRIPTION OF THE DRAWINGS

The above and other aspects, features and advantages of the present invention will be more apparent from the following detailed description when taken in conjunction with the accompanying drawings, in which:

FIG. 11 is a flowchart illustrating a display edit method of a touch display apparatus, according to an embodiment of the present invention.

DETAILED DESCRIPTION OF EMBODIMENTS OF THE PRESENT INVENTION

Figure 1:
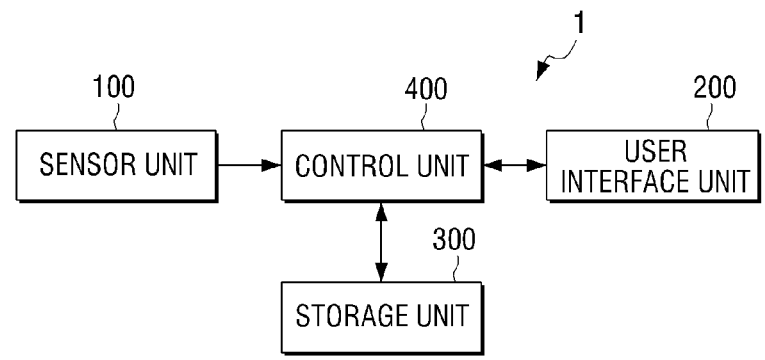
FIG. 1 is a schematic block diagram illustrating a touch display apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a touch display apparatus 1, according to an embodiment of the present invention.

As shown in FIG. 1, the touch display apparatus 1 may include a sensor unit 100, a user interface unit 200, a storage unit 300 and a control unit 400.

The sensor unit 100 detects a degree and/or direction of an overall movement of the touch display apparatus 1. For example, the sensor unit 100 may detect a panning operation of the touch display apparatus 1 in a direction that is horizontal to the ground. The sensor unit 100 may detect a distance and displacement panned from a reference point, as well as a speed and an acceleration of the touch display apparatus 1. The sensor unit 100 uses an inertial component of the touch display apparatus 1.

The sensor unit 100 may also detect a tilting or rotating operation of the touch display apparatus 1, in a specific direction. The sensor unit 100 may detect a rotating operation in a left or right direction on an axis that vertically passes through an arbitrary point of a lower portion of a front of the touch display apparatus 1. This operation is described in greater detail with reference to FIG. 5.

The sensor unit 100 may detect a tilting operation toward the left or right on an axis that vertically passes through two opposite surfaces adjacent the front of the touch display apparatus 1. This operation is described in greater detail with reference to FIG. 6.

The sensor unit 100 may include a gyro sensor and/or a linear acceleration sensor in order to detect the above-described panning, tilting and/or rotating operations. However, these sensors are provided in one embodiment of the sensor unit 100, and other sensors, mechanisms or devices may also be used to detect the panning, tilting, and/or rotating operation of the touch display apparatus 1.

The user interface unit 200 may be implemented as a touch screen. The touch screen can directly receive input information on the screen so that when a hand or other objects touches a character displayed on the screen, or a specific position on the screen, a specific process is performed by stored software in accordance with the touched character or position.

The touch screen is capable of performing functions by attaching a touch panel to a screen of a general monitor. A plurality of infrared grids are formed on the screen so that a position of the screen can be determined when a finger tip or other objects touches the grid.

When a hand touches character or picture information displayed on the screen mounted with the touch panel, the selected item is understood according to the touched position and a command corresponding to the selected item is processed by a computer, enabling a user to readily obtain desired information.

The user interface unit 200 outputs a touch signal the control unit 400.

Further, the user interface unit 200 may display various kinds of screens. More specifically, the user interface unit 200 may display a background screen, which displays GUI items, such as icons indicating a plurality of applications.

The user interface unit 200 can receive instructions from the control unit 400 to display a display screen of an application currently being executed, a web browser screen, a screen corresponding to a multimedia file, or the like.

The storage unit 300 stores graphic data required to implement a screen displayed on the user interface unit 200. The storage unit 300 provides the stored graphic data to the control unit 400 in accordance with control commands of the control unit 400.

Further, the storage unit 300 may further store graphic data required to implement a new screen generated by the control unit 400.

The storage unit 300 may also store various kinds of application programs, a web browser, and multimedia files.

The control unit 400 may control an overall operation of the sensor unit 100, the user interface unit 200 and the storage unit 300.

The control unit 400 detects an operation to enter an edit mode when a preset edit mode entering operation is input to the user interface unit 200. The control unit 400 controls the user interface unit 200 to display a screen corresponding to an edit mode, i.e., a screen indicating the edit mode state.

In the edit mode, a GUI item, text, an image or the like, which are displayed on a background screen or a web browser screen may be moved to other background screens, other web browser screens, or the like.

In the edit mode entering operation, a GUI item, text or an image to be moved is designated simultaneously with entry to the mode. In an embodiment of the present invention, various edit mode entering operations are implemented, and the operations are described in greater detailed with respect to FIGS. 3A-3C.

The GUI item, text, or image to be moved, is commonly referred to as target edit content.

The screen indicating the edit mode state may be stored in the storage unit 300 in graphic data form. The control unit 400 may generate the screen indicating the edit mode state using graphic data, after the control unit 400 reads the graphic data for a background screen display from the storage unit 300.

The control unit 400 may generate graphic data for forming a corresponding screen based on a degree or direction of movement of the touch display apparatus 1 detected from the sensor unit 100. In addition, the control unit 400 may control the storage unit 300 to store the graphic data.

The control unit 400 may control the user interface unit 200 to display the corresponding screen using the graphic data generated on the basis of the motion of the touch display apparatus 1.

In particular, the control unit 400 may control the user interface unit 200 to display a screen converted according to the degree or direction of the motion of a panning, tilting or rotating of the touch display apparatus 1.

While the screen converted according to the degree or direction of the motion of the touch display apparatus 1 is displayed on the user interface unit 200, when a user inputs an edit mode releasing operation to the user interface unit 200, the control unit 400 controls the user interface unit 200 to end the edit mode with the target edit target content displayed on the converted screen.

According to the above-described embodiment of the present invention, the touch display apparatus 1 can easily edit the screen by the tilting, panning or rotating the touch display apparatus 1, without moving the target edit target content to a bottom of the display screen.

Figure 2:
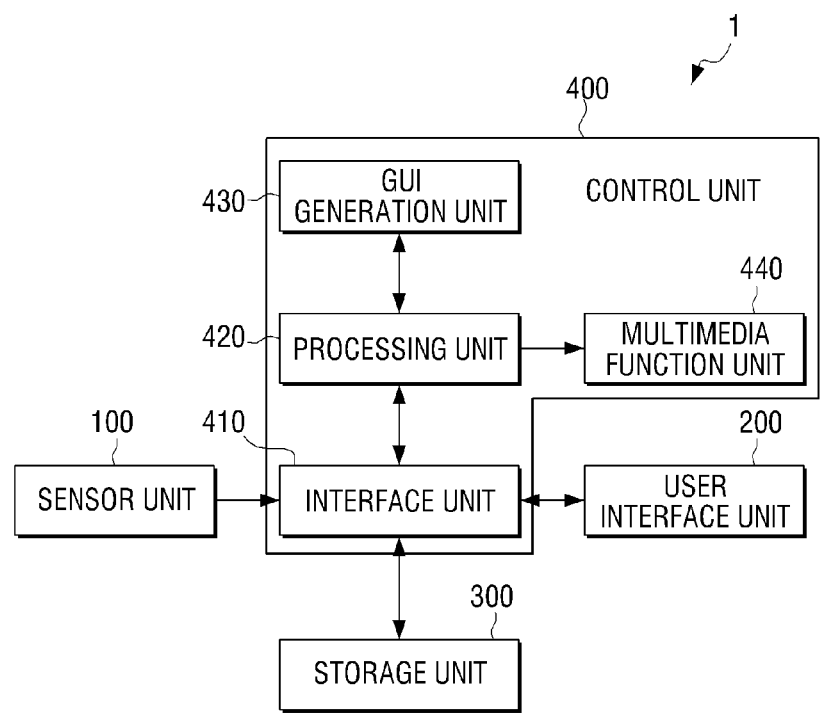
FIG. 2 is a detailed block diagram illustrating a touch display apparatus, according to an embodiment of the present invention.

FIG. 2 is a block diagram illustrating a touch display apparatus 1, according to an embodiment of the present invention. As shown in FIG. 2, the touch display apparatus 1 includes the sensor unit 100, the user interface unit 200, the storage unit 300 and the control unit 400. The control unit 400 includes an interface unit 410, a processing unit 420, a multimedia function unit 440 and a GUI generation unit 430.

Configuration of the touch display apparatus 1 of FIG. 2 is the same as that of FIG. 1.

The interface unit 410 included in the control unit 400 may receive a signal, indicating that an edit mode entering operation, is input by a user, from the user interface unit 200. The interface unit 410 may receive information related to motion of the touch display apparatus 1 from the sensor unit 100. As described above, the motion of the touch screen apparatus 1 may include panning, tilting, and/or rotating of the touch display apparatus 1.

When the signal indicating that the edit mode entering signal is input to the interface unit 410 and the motion of the touch display apparatus 1 is received, the processing unit 420 allows the GUI generation unit 430 to form digital data for implementing a new screen based on the motion.

The new screen may be stored in the storage unit 300 or transmitted to the user interface unit 200 through the interface unit 410. The processing unit 420 may convert the graphic data for the new screen into analog graphic data and transmit the analog graphic data to the user interface unit 200.

The user interface unit 200 may display the received analog graphic data for the new screen to the user. The user interface unit 200 may also include an Analog to Digital Converter (ADC) therein so that a conversion operation can be performed within the user interface unit 200.

Subsequently, when the user inputs an edit mode releasing operation to the user interface unit 200, the edit mode releasing operation is transmitted to the interface unit 420 of the control unit 400.

The processing unit 420 may release the edit mode corresponding to the edit mode releasing operation and store the new screen in the storage unit 300 as an edit completion screen.

The multimedia function unit 440 performs a basic function to reproduce contents, such as a moving image, a still image, music or text, or to display a background screen. In accordance with embodiments of the present invention, the main function of the multimedia function unit 440 is to reproduce the still image or the moving image.

Figure 3A:
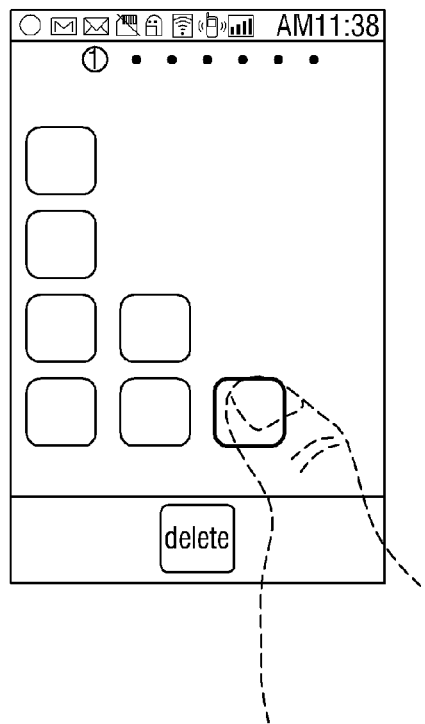
FIGS. 3A-3C are diagrams illustrating an edit mode entering operation, according to an embodiment of the present invention.
Figure 3B:
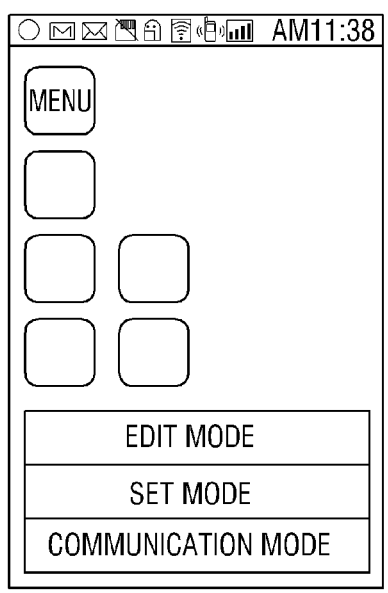
Figure 3C:
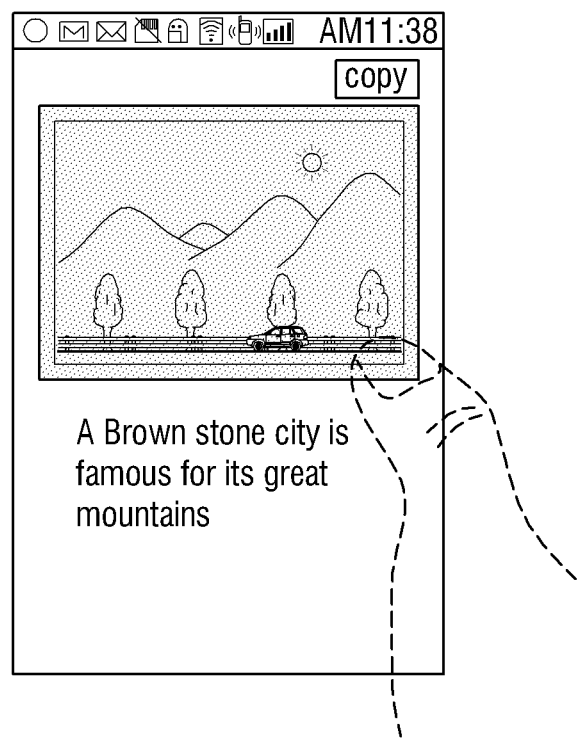

FIGS. 3A-3C are diagrams illustrating the edit mode entering operation, according to an embodiment of the present invention.

FIG. 3A is a diagram illustrating an edit target as a background screen including a plurality of application identification icons, according to an embodiment of the present invention. User can select an application identification icon on the background screen by single touch or long touch and so on. The control unit 400 designates the selected icon as the target edit content As shown in FIG. 3A, the control unit 400 can designate the target edit content and simultaneously enter the edit mode, if user touchs an application identification icon corresponding to the target edit content for a preset time.

Further, as shown in FIG. 3A, the target edit content may be identified by the user through by changing a color around the content. However, the method of changing the color of the target edit content is only one embodiment of the present invention, and other methods of identifying the target edit content may be used.

FIG. 3B is a diagram illustrating an edit mode entering operation, according to an embodiment of the present invention.

As shown in FIG. 3B, a user touches an application identification icon corresponding to a "menu" disposed on the top left of a display in order to provide a mode configuration table, as illustrated at the bottom of the display.

The user may touch "edit mode" of the mode configuration table to enter the edit mode.

FIG. 3C is a diagram illustrating an edit mode entering operation, according to an embodiment of the present invention.

In FIG. 3C, a display target to be edited is a web browser screen including text and an image. As shown in FIG. 3C, a user touches an image, and if the image is designated and the word "copy" is displayed, the user may touch the word "copy" to designate the image as the target edit target content and simultaneously allow the touch display apparatus 1 to enter the edit mode.

As described above, the user can designate the target edit content and simultaneously enter the edit mode in various manners. In addition, the user can use a background screen including icons as well as a web browser screen as the edit target.

Figure 4:
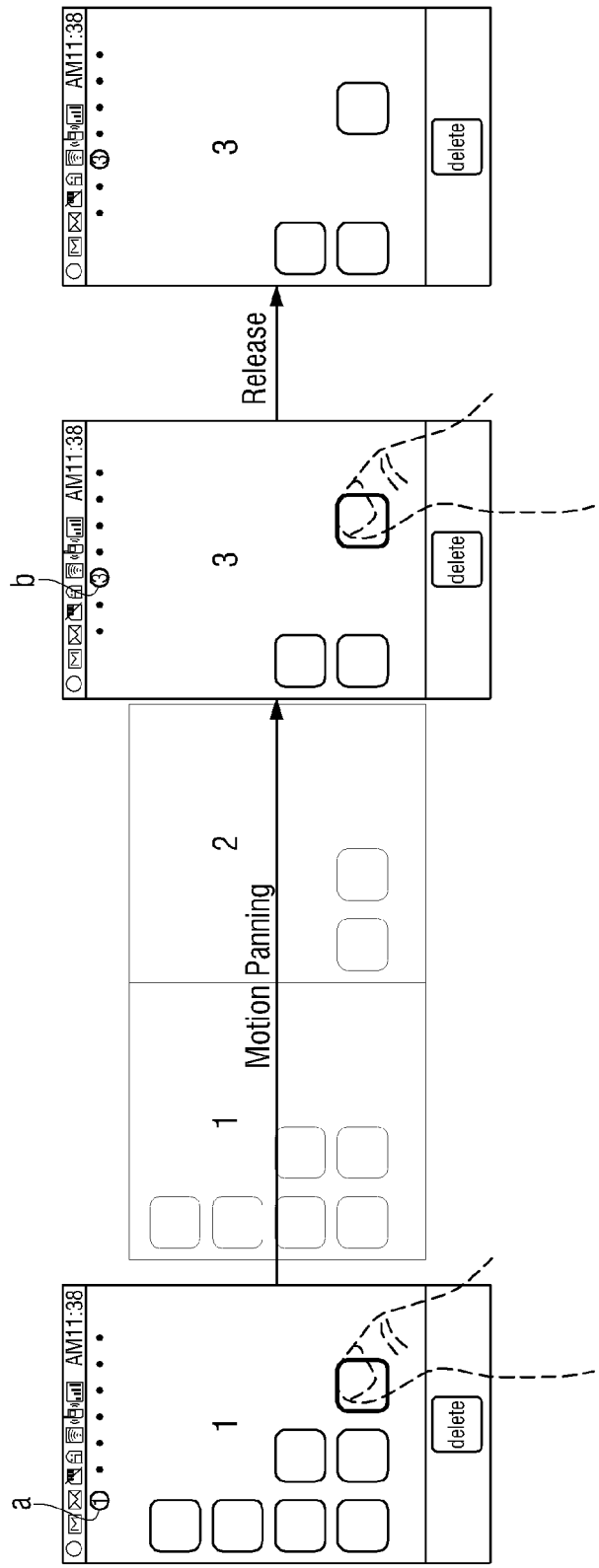
FIG. 4 is a diagram illustrating a process of editing a background screen through a panning operation of a touch display apparatus, according to an embodiment of the present invention.

FIG. 4 is a diagram illustrating a display edit process of the touch display apparatus 1, according to an embodiment of the present invention.

The user interface unit 200 displays a background screen that includes a plurality of application identification icons. As shown in FIG. 4, a user may touch a specific icon displayed on the user interface unit 200. The operation is the same as that described with reference to FIG. 3A. The user designates the bottom rightmost icon of the plurality of application identification icons as an edit target icon and simultaneously enters an edit mode.

The number "1", which is displayed at the top left portion of the user interface unit 200 is a page identification number 'a' indicating that a background screen that is currently displayed on the user interface unit 200.

The user may perform an operation of panning the touch display apparatus 1 to the right. When the sensor unit 100 detects that the touch display apparatus 1 is panned over a preset distance threshold value, the control unit 400 controls the user interface unit 200 to display a new screen, which now includes the target edit content, corresponding to the panning distance of the touch display apparatus 1.

In the embodiment of the present invention illustrated in FIG. 4, the user pans the touch display apparatus 1 to the right approximately twice the preset distance threshold value, and the sensor unit 100 detects the panning distance and direction and transmits the detected distance and direction to the control unit 400.

The control unit 400 controls the user interface unit 200 to display the new screen, with the target edit content, based on the information received from the sensor unit 100.

More specifically, the control unit 400 may form the new screen based on the background screen that is 2 pages from the initial page 1 in a right direction, i.e., page 3, since the touch display apparatus 1 is panned more than twice but less than thrice the distance threshold value to the right. More generally, the control unit 400 generates the new screen from a menu screen that is n pages from the initial display page, when the panning distance of the touch display apparatus 1 is more than n times and less than n+1 times the distance threshold value. Here, n is natural number.

As described above with reference to FIG. 2, the GUI generation unit 430 may read the third page from the storage unit 300 and generate a new screen that includes the target edit target in the third page.

A page identification number 'b' of the new screen of FIG. 4 is '3'. The new page is generated having the target edit contend included in background screen 3, which is 2 pages from an original background screen to the right.

After the new screen is generated, the user may perform an edit mode releasing operation for releasing the edit mode. The edit mode releasing operation of the user may be when the touch is released. The edit mode releasing operation may also be signified by touching a portion of the background other than the previously selected GUI item. However, any number of methods may be used to signify the above-described edit mode releasing operation.

When the edit mode releasing operation is input to the user interface unit 200, the control unit 400 controls the user interface unit 200 to end the edit mode and display the target edit target in its current position. The control unit 400 may control the user interface unit 200 so that an edit-related function is not displayed even when the edit-related operation is input to the user interface unit 200.

The effect resulting from panning the touch display apparatus 1 to right may also result from panning the touch display apparatus 1 upwards or downwards.

Further, the control unit 400 may control the user interface unit 200 so that the process of changing from a previous screen to next screen is identified by the user before the new screen is displayed on the user interface unit 200.

For example, the user interface unit 200 may display that the previous edit mode screen is gradually converted into the next edit mode screen while sliding or scrolling the previous edit mode screen according to the degree and direction of the motion.

The screen being displayed on the user interface unit 200 during the conversion process may be a screen having a portion of the previous edit mode screen and a portion of the next edit mode screen. Further, the screen being displayed during the conversion process may be a display screen between the previous edit mode screen and the next edit mode screen, for example, page 2.

The control unit 400 may determine a speed of sliding or scrolling based on the degree of the motion. For example, when the user pans the touch display apparatus 1 at fast speed, the control unit 400 may control the user interface unit 200 to display sliding at fast speed.

In addition, the control unit 400 may determine the speed of sliding or scrolling as proportional to the panning distance.

According to the above-described embodiments of the present invention, the user may pan the touch display apparatus 1 to edit the background screen including the application identification icon.

Figure 5:
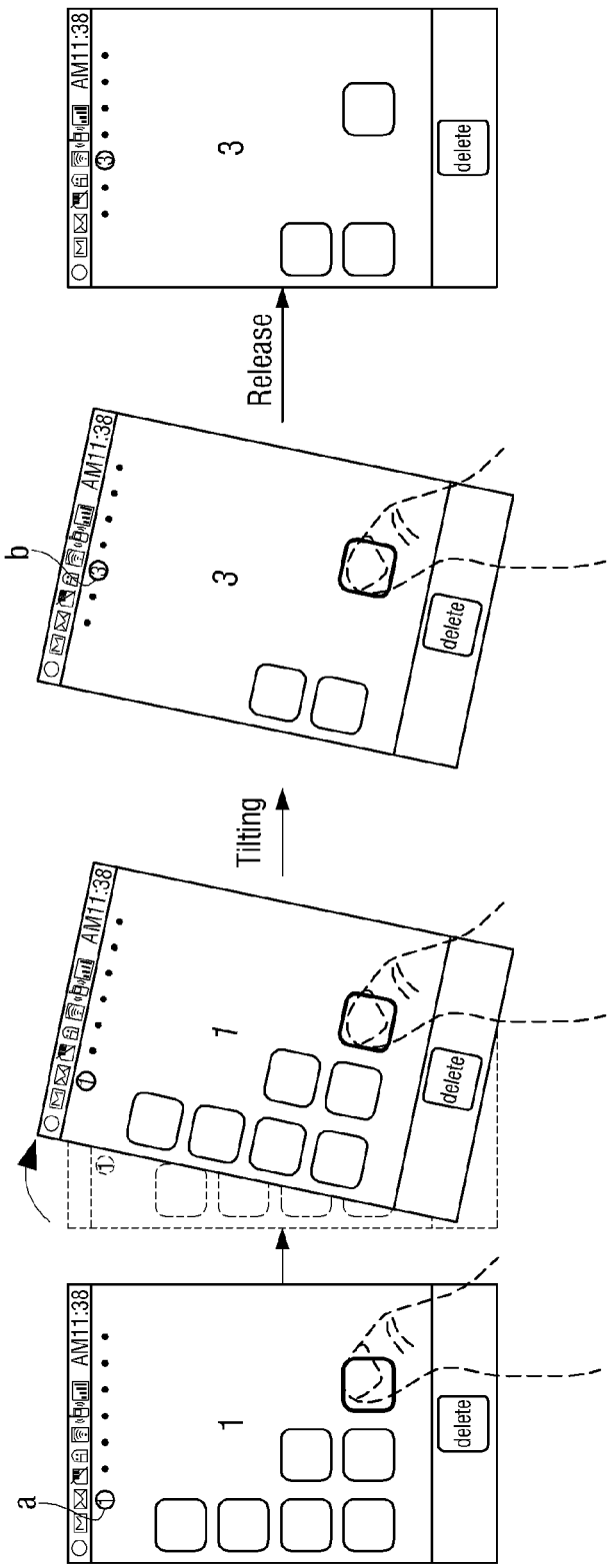
FIG. 5 is a diagram illustrating a process of editing a background screen through a tilting operation of a touch display apparatus, according to an embodiment of the present invention.

FIG. 5 is a diagram illustrating a display process of the touch display apparatus 1, according to an embodiment of the present invention.

The user interface unit 200, which displays a background screen having a plurality of application identification icons, is illustrated in FIG. 5. As shown in FIG. 5, the user may touch a specific icon displayed on the user interface unit 200. Such an operation is the same as the operation described with reference to FIG. 3A, so that the user designates the bottom rightmost icon of the plurality of application identification icons as the target edit icon and simultaneously enter the edit mode.

The user may perform an operation of rotating the touch display apparatus 1 to the right. When the sensor unit 100 detects that the touch display apparatus 1 is rotated above a preset distance threshold value, the control unit 400 may control the user interface unit 200 to display a new screen, with the target edit content, corresponding to a rotation angle of the touch display apparatus 1.

The rotation of the touch display apparatus 1 in FIG. 5 may be performed on an axis of rotation that vertically passes through a center of a front of the touch display apparatus 1.

In the embodiment of the present invention illustrated in FIG. 5, the user rotates the touch display apparatus 1 more than twice and less than thrice a preset angle threshold value to the right, and the sensor unit 100 detects an angle and direction of the rotation. Specifically, the sensor unit 100 detects information that the touch display apparatus 1 is rotated more than two times and less than three times an angle threshold value, and the information is transmitted to the control unit 400.

The control unit 400 controls the user interface unit 200 to display a new screen, with the target edit content, based on the information received from the sensor unit 100.

More specifically, the control unit 400 may form the new screen based on the background screen that is two pages from an initial page 1 in the right direction, i.e., page 3, since the touch display apparatus 1 is rotated more than two times and less than 3 times the angle threshold value to the right. More generally, the control unit 400 forms the new screen from the target edit content and the menu screen, which is n pages from an initial screen, when a tilting angle of the touch display apparatus 1 is more than n times and less than n+1 times the angle threshold value.

According to the above-described embodiment of the present invention, the user can easily edit the background screen including the application identification icons by tilting the touch display apparatus 1 with respect to a reference angle.

Figure 6:
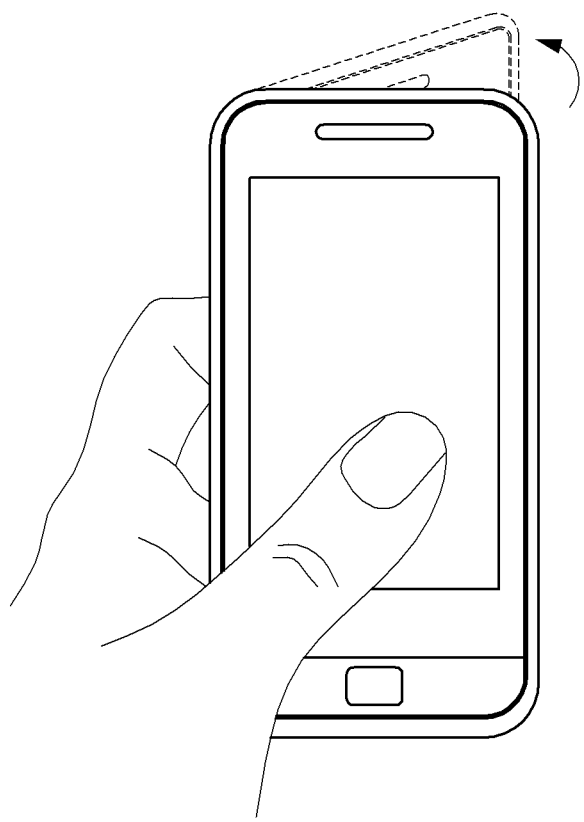
FIG. 6 is a diagram illustrating a titling method of a touch display apparatus, according to an embodiment of the present invention.

FIG. 6 is a diagram illustrating a method of tilting the touch display apparatus 1, according to an embodiment of the present invention.

As shown in FIG. 6, the user may implement the editing method described above with reference to FIG. 5 by tilting the touch display apparatus 1 on the axis of rotation that vertically passes through centers of an upper and lower surfaces adjacent to a front of the touch display apparatus 1.

Figure 7A:
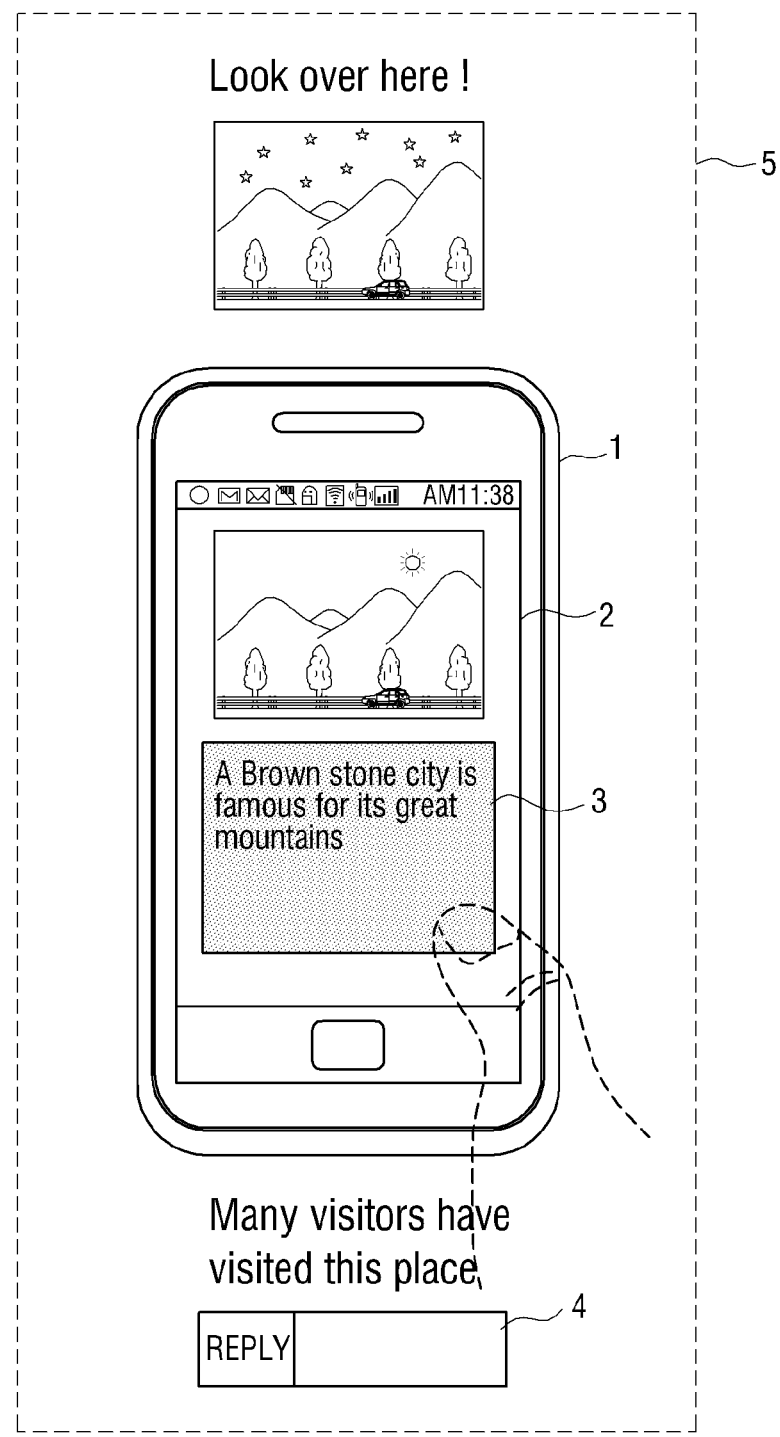
FIGS. 7A-7C are diagrams illustrating a process of editing a single web browser through a panning operation of a touch display apparatus, according to an embodiment of the present invention.
Figure 7B:
Figure 7C:
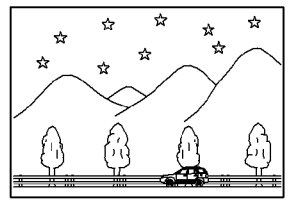
Figure 7C:
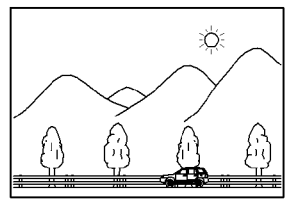
Figure 7C:
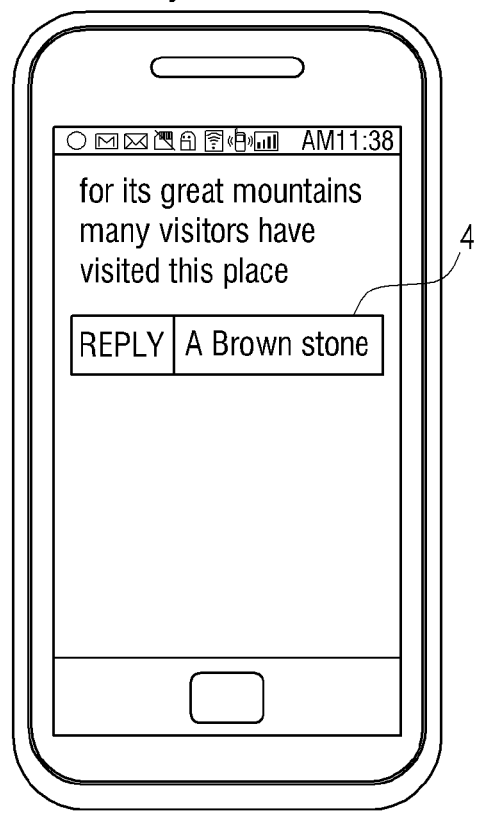

FIGS. 7A-7C are diagrams illustrating a display method, according to an embodiment of the present invention.

As shown in FIG. 7A, the touch display apparatus 1 displays only a portion 2 of an overall web browser window 5 of a specific address. Specifically, the overall web browser window 5 includes the portion 2 displayed by the touch display apparatus 1 and a portion not displayed by the touch display apparatus 1.

In the embodiments of the present invention illustrated in FIGS. 7A-7C, it is assumed that the user desires to copy a specific text 3 of the portion 2 displayed by the touch display apparatus 1, and paste the copied text to a partial area 4 of a portion the overall web browser window that is not displayed by the touch display apparatus 1.

As shown in FIG. 7A, the user may enter the edit mode while designating the specific text 3 of contents displayed on the user interface unit 200 as the target edit content. This may be performed in accordance with that described above with respect to FIG. 3C.

As shown in FIG. 7B, the user may pan the touch display apparatus 1 downwards and the user interface unit 200 may display another portion of the web browser window 5 corresponding to the downwardly panned distance of the touch display apparatus 1. A configuration that the user interface unit 200 displays the other portion of the web browser window 5 is a manner similar to that described in FIG. 5. Specifically, the control unit 400 may control the user interface unit 200 to display a screen corresponding to the web browser window 5 stored in the storage unit 300.

As shown in FIG. 7B, in the process of panning the touch display apparatus 1, the control unit 400 may control the user interface unit 200 to display other areas of the web browser window 5 when the user is not touching the user interface unit 200.

When the partial area 4 is displayed on the user interface unit 200, the user may perform a paste operation for the copied text, as shown in FIG. 7C.

When the editing process desired by the user is ended, the user may perform the above-described edit mode releasing operation to release the edit mode of the touch display apparatus 1.

According to embodiments of the present invention, the user can edit the background screen including application identification icons and edit within the web browser window 5, which has portions displayed and not displayed by the touch display apparatus 1.

Figure 8:
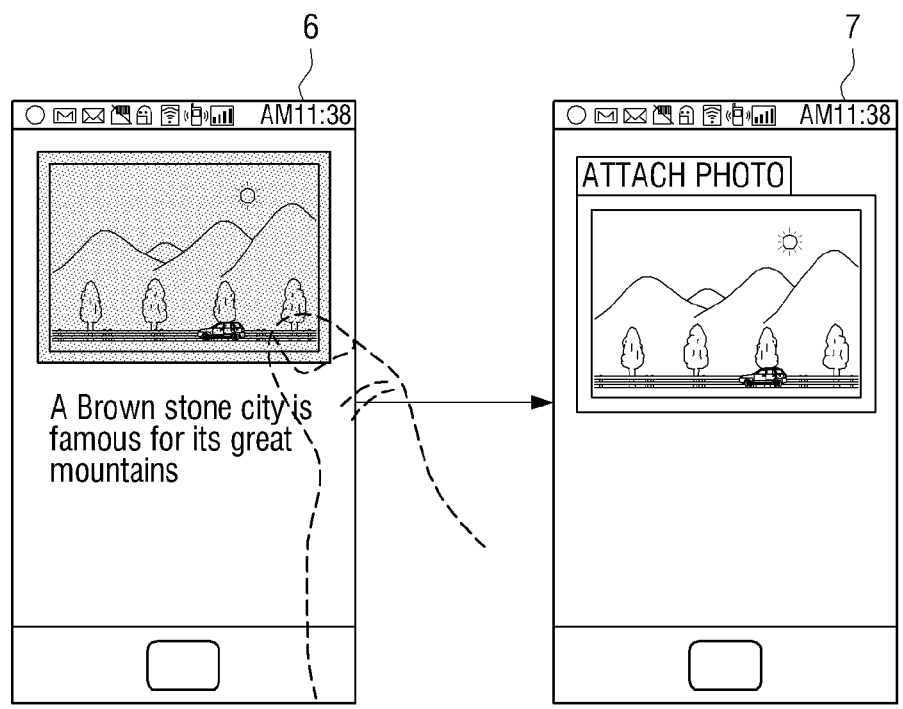
FIG. 8 is a diagram illustrating a process of editing between a plurality of web browser screens through a tilting operation of a touch display apparatus, according to an embodiment of the present invention.

FIG. 8 is a diagram illustrating a display edit between a plurality of web browser windows, according to an embodiment of the present invention.

As shown in FIG. 8, the touch display apparatus 1 may perform multitasking for a first web browser window 6 and a second web browser window 7. In the embodiment of the present invention illustrated in FIG. 8, the user desires to copy a specific image of the first web browser window 6 and register the copied specific image to the second web browser window 7.

The user may perform the edit mode entering operation so that the touch display apparatus 1 enters the edit mode while designating the specific image of the first web browser window 6 as the edit target content.

The user interface unit 200 may display the second web browser window 7 by panning the touch display apparatus 1 to the right.

The user can easily edit content, such as an image or text, between a plurality of web browser windows, which are in multitasking, by pasting the copied specific image, that is, the target edit content to an "attach photo" window displayed on the second web browser 7.

In addition, the user copies the target edit content from the first web browser window 6, moves the copied target edit content to the second web browser window 7, and moves and pastes the target edit content to a portion that is not initially displayed within the second web browser window 7 as described above with reference to FIGS. 7A to 7C.

Figure 9:
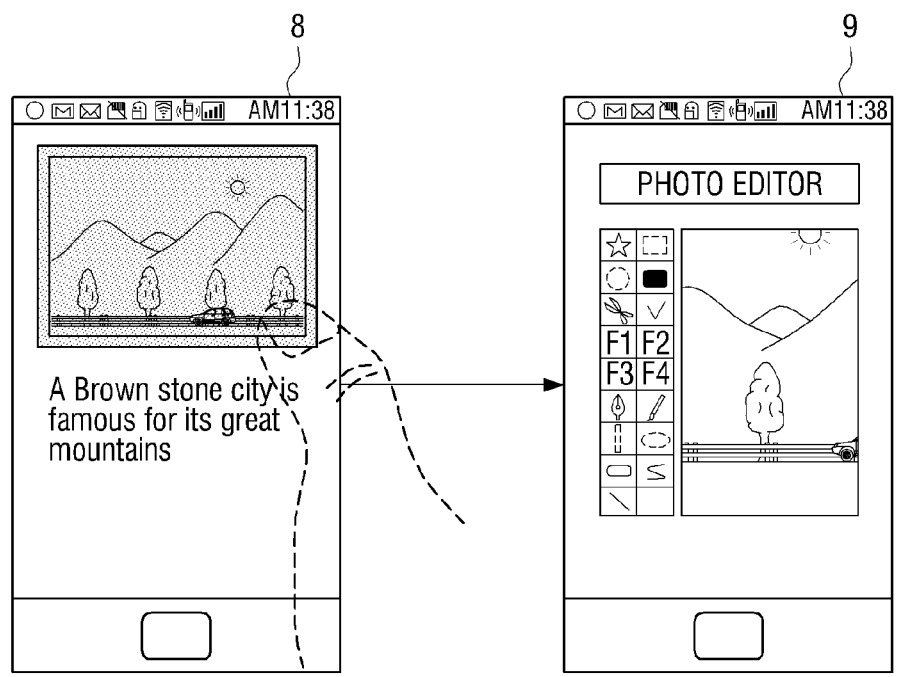
FIG. 9 is a diagram illustrating a process of editing between a plurality of application screens through a tilting operation of a touch display apparatus, according to an embodiment of the present invention.

FIG. 9 is a diagram illustrating a method of editing between a plurality of applications that are in multitasking, according to an embodiment of the present invention.

As shown in FIG. 9, the touch display apparatus 1 may multitask the plurality of applications. For example, the touch display apparatus 1 may multitask a web browser application and a photo editor application.

In the embodiment of the present invention illustrated in FIG. 9, the user desires to copy an image displayed on the web browser application and paste the copied image to the photo editor application.

The user may perform the edit mode entering operation so that the touch display apparatus 1 enters the edit mode while designating a specific image of a web browser window 8 as the target edit content.

The user interface unit 200 may display a photo editor application window 9 by panning the touch display apparatus to the right.

Sliding speed is determined as being proportional to the panning distance, as described above with reference to FIG. 4.

The user can easily perform a process of editing content, such as an image or text, between the plurality of applications, which are in multitasking, by pasting the copied specific image, i.e., the target edit content, to the edit window displayed on the photo editor application window 9.

In addition, the user copies the target edit content from the web browser window 8, moves the copied target edit content to the photo editor application window 9, and moves and pastes the target edit content to a portion not initially displayed within the photo editor application window 9, as described above with reference to FIGS. 7A-7C.

According to the above-described embodiments of the present invention, the user can perform a process of editing the background screen including the application identification icons, the web browser window, the plurality of web browser windows, and contents between the plurality of application.

Figure 10:
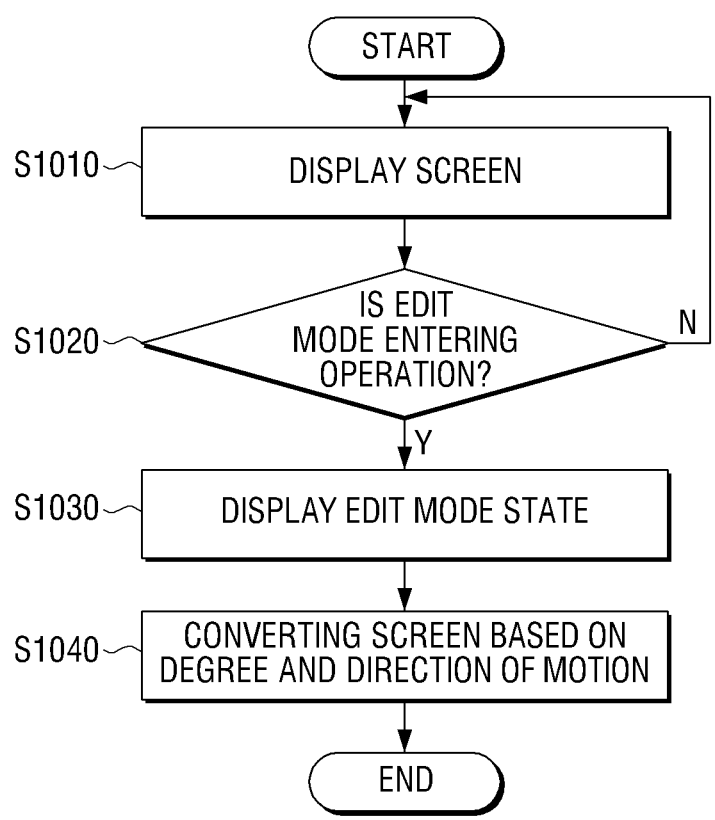
FIG. 10 is a flowchart illustrating a display method of a touch display apparatus, according to an embodiment of the present invention.

FIG. 10 is a flow chart illustrating a display method of the touch display apparatus 1, according to an embodiment of the present invention.

A screen including at least one content is displayed in step S1010.

In step S1020 is determined whether the touch display apparatus 1 detects an edit mode entering operation performed by a user. When the edit mode entering operation is detected, the screen is displayed in an edit mode state, in step S1030. When the edit mode entering operation is not detected, the methodology returns to step S1010.

In step S1040, the screen converted based on a degree and/or direction of motion, and target edit content is displayed on the converted screen.

The motion of the touch display apparatus 1 is preferably one of titling, panning, or rotating of the touch display apparatus 1.

The screen may be a background screen including application identification icons, a web browser window, an application window, or a display including a background having application identification icons, a web browser window, an application window and edit target content.

According to the above-described embodiment of the present invention, the user can intuitively move the display to easily edit of the display.

FIG. 11 is a flow chart illustrating a method of editing a display, according to an embodiment of the present invention.

In step S1110, an edit mode screen is displayed when an edit mode entering operation by a user is detected.

The touch display apparatus 1 detects a moving operation such as panning, tilting, or rotating, in step S1120. It is determined whether a panning distance, or a titling or rotating angle, is greater than $1/\text{'t'} \times a$, in step S1130.

Here, 'a' denotes a threshold value of the distance or angle, and 't' denotes a time used for sequentially providing a plurality of changing displays. Specifically, the plurality of changing displays may be provided one by one every t seconds. The speed for providing the plurality of changing displays is $1/t$.

When the panning distance or the tilting or rotating angle is less than or equal to the threshold value, the touch display apparatus 1 again detects the panning distance, or the tilting or rotating angle, in step S1120.

If the panning distance or the tilting angle is greater than the threshold value, the touch display apparatus 1 gradually converts a previous edit mode screen into next edit mode screen while sliding the previous edit mode screen at speed of $1/t$, in step S1140.

After the plurality of changing displays are provided, a screen corresponding to the panning distance or the tilting/rotating angle is provided, in step S1150.

In step S1160, it is determined whether the user performs an edit mode releasing operation.

If the edit mode releasing operation is detected, the touch display apparatus 1 ends the edit mode, in step S1170. If the edit mode releasing operation is not detected, the methodology returns to step S1150.

According to the above-described embodiment of the present invention, the user can intuitively move the display to easily perform editing of the display.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by the control unit 400.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic apparatus comprising:
a touch screen to sequentially display one of a plurality of screen pages based on a first user input;
a sensor unit to output a signal relating to a movement of the electronic apparatus; and
a control unit to select an item on a first screen page based on a second user input received via the touch screen and to change from the first screen page on the touch screen to a second screen page on the touch screen based on the signal relating to the movement of the electronic apparatus from the sensor unit, such that the selected item is displayed on the second screen page.

2. The electronic apparatus of claim 1, wherein, after the second screen page is displayed on the touch screen, the control unit positions the selected item in the second screen page according to touch information received via the touch screen.

3. The electronic apparatus of claim 1, wherein the control unit enters an edit mode after the item is selected from the first screen page, and
during the edit mode, the control unit is configured to process output signals from the touch screen, concurrently with processing of output signals from the sensor unit, to determine that the touch screen is being concurrently touched during transitioning from the first screen page to the second screen page.

4. The electronic apparatus of claim 3, wherein, during the edit mode, the control unit is configured to determine that the selected item is being continuously touched based on touch information received from the touch screen and to display the selected item at a location on the touch screen corresponding to the received touch information while the first screen page is being transitioned to the second screen page.

5. The electronic apparatus of claim 4, wherein the control unit is configured to exit from the edit mode when it is determined that a touch is released.

6. The electronic apparatus of claim 5, wherein the control unit is configured to detect a tilt movement with respect to an axis of rotation that passes longitudinally through centers of upper and lower surfaces of the apparatus based on signals received from the sensor unit and to control transitioning from the first screen page to the second screen page based on the detected tilt movement.

7. The electronic apparatus of claim 6, wherein, in the edit mode, the control unit is configured to change a location of the item arranged on a plurality of background screen pages based on the touch information obtained from the touch screen and the movement-related information obtained from the sensor unit.

8. The electronic apparatus of claim 1, wherein the first screen page and the second screen page are associated with different multitasking applications executed by the electronic apparatus.

9. The electronic apparatus of claim 1, wherein the sensor unit comprises a gyro sensor to detect at least one of panning, tilting and rotating movements.

10. The electronic apparatus of claim 1, wherein the sensor unit comprises an acceleration sensor to detect at least one of panning, tilting and rotating movements.

11. A method of moving an element from a first screen to a second screen each displayed on a single touch screen of an electronic apparatus, the method comprising the steps of:
displaying the first screen including the element on the touch screen;
designating the element on the first screen based on a user input received via the touch screen of the electronic apparatus; and
changing from the first screen on the touch screen to the second screen on the touch screen based on a signal relating to a movement of the electronic apparatus from a sensor unit, such that the designated element is displayed on the second screen.

12. The method of claim 11, further comprising:
changing the electronic apparatus to an edit mode when the element on the first screen is touched for a predetermined period of time.

13. The method of claim 12, further comprising:
when the element is no longer touched, releasing the edit mode while the designated element is displayed on the second screen.

14. The method of claim 12, further comprising:
when the electronic apparatus is converted to the edit mode, displaying the first screen as an edit mode status display screen.

15. The method of claim 11, further comprising:
changing the electronic apparatus to an edit mode when an edit option is selected.

16. The method of claim 11, further comprising:
when the element on the first screen is designated, displaying at least one word on a side area of the designated element,
wherein the electronic apparatus is converted to an edit mode when a command to perform editing is selected from among the at least one displayed word.

17. The method of claim 11, further comprising:
when a background of the second screen is touched, releasing the edit mode while the designated element is displayed on the second screen.

18. The method of claim 11, wherein the element is one of a plurality of icons displayed on the first screen of the electronic apparatus, and
wherein changing from the first screen comprises gradually changing from the first screen of the electronic apparatus to the second screen, at a speed corresponding to a magnitude of the movement detected by the sensor unit by sliding or scrolling the first screen to the second screen.

19. The method of claim 11, wherein changing the first screen comprises, when a magnitude of the movement is greater than n times and less than n+1 times a threshold value, changing the first screen to the second screen which is n pages from the first screen.

20. The method of claim 11, wherein the first screen comprises one of an application screen, a web browser screen, and a multimedia file screen, and the element comprises an image or text displayed on the first screen, and
wherein changing the first screen comprises changing the first screen into the second screen which is another application screen, another web browser screen or another multimedia file screen.

21. The method of claim 11, wherein the movement comprises at least one of panning, tilting and rotating the electronic apparatus.

22. A method for displaying a designated element, the method comprising the steps of:
when a movement of an electronic apparatus is detected, changing from a first screen to a second screen, each displayed on a screen of the electronic apparatus, according to the detected movement; and
displaying the designated element on the second screen, wherein the element is designated from the first screen.

23. The method of claim 22, further comprising:
transitioning to an edit mode after the element is designated from the first screen, and
during the edit mode, processing touch information received from a touch screen, concurrently while processing movement information received from a motion sensor unit, to determine that the touch screen is being touched during transitioning from the first screen to the second screen.

24. The method of claim 23, wherein the designated element is displayed at a location on a touch screen corresponding to the touch information while the first screen is being changed to the second screen.

25. The method of claim 24, further comprising:
exiting from the edit mode when it is determined that a touch is released based on the touch information.

26. An article of manufacture for controlling a touch display apparatus, comprising a non-transitory machine readable medium containing one or more programs which when executed implement the steps of:
displaying a first screen including at least one element on the touch display apparatus;
designating an element on the first screen;
changing the touch display apparatus to an edit mode, when the element on the first screen is designated;
when a movement of the touch display apparatus is detected, changing from the first screen to a second screen according to the detected movement; and
displaying the designated element on the second screen.

* * * * *